(12) United States Patent
Zhang et al.

(10) Patent No.: US 7,116,087 B2
(45) Date of Patent: Oct. 3, 2006

(54) CURRENT SHARING METHOD AND APPARATUS FOR ALTERNATELY CONTROLLING PARALLEL CONNECTED BOOST PFC CIRCUITS

(75) Inventors: Qingyou Zhang, Taoyuan Shien (TW);
Aibin Qiu, Taoyuan Shien (TW);
Jianping Ying, Taoyuan Shien (TW);
Jianhong Zeng, Taoyuan Shien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 121 days.

(21) Appl. No.: 10/916,307

(22) Filed: Aug. 11, 2004

(65) Prior Publication Data
US 2005/0036337 A1 Feb. 17, 2005

(30) Foreign Application Priority Data
Aug. 11, 2003 (TW) .............. 92122036 A

(51) Int. Cl.
*G05F 1/40* (2006.01)
(52) U.S. Cl. ............ 323/272; 323/222; 363/21.09
(58) Field of Classification Search ............ 363/20, 363/21.2, 21.4, 95, 65, 97, 131, 21.09; 323/282–286, 323/271–273, 222
See application file for complete search history.

(56) References Cited
U.S. PATENT DOCUMENTS
5,905,369 A * 5/1999 Ishii et al. ............... 323/272
6,009,000 A * 12/1999 Siri .................... 363/21.09

FOREIGN PATENT DOCUMENTS
CN 1353497 6/2002

OTHER PUBLICATIONS
Balogh et al., Power-Factor Correction with Interleaved Boost Converters in Continuous-Inductor-Current Mode, 1993, Proceedings of APEC, pp. 168-174.

* cited by examiner

*Primary Examiner*—Rajnikant B. Patel
(74) *Attorney, Agent, or Firm*—Volpe and Koenig, P.C.

(57) ABSTRACT

The provided method and control circuit are employed to alternately control the dual boost PFC circuits. The control circuit for alternately controlling parallel-connected first and second boost circuits of a dual boost PFC circuit to achieve a current-sharing of the first and the second boost circuits includes: a first control circuit having a first current control loop for employing an output voltage of the PFC circuit, a feed-forward voltage, and an input reference voltage to generate a current reference, and sending the current reference to an input terminal of the first current control loop to generate a first PWM signal to drive the first boost circuit, and a second control circuit having a second current control loop for receiving the current reference through an input terminal of the second current control loop to generate a second PWM signal to drive the second boost circuit.

12 Claims, 6 Drawing Sheets

CURRENT SHARING METHOD AND APPARATUS FOR ALTERNATELY CONTROLLING PARALLEL CONNECTED BOOST PFC CIRCUITS

FIELD OF THE INVENTION

The present invention relates to the current-sharing method and the control circuit for alternately controlling the power factor correction (PFC) circuits. More specifically, this invention relates to the current-sharing method and the control circuit for alternately controlling the dual boost PFC circuits.

BACKGROUND OF THE INVENTION

The traditional boost PFC circuits are widely used due to their unique features of: simplicity, capability of boosting the voltages, and relatively higher efficiency. Following that the relatively higher power levels of the power sources are more and more desired, several of these modulated boost PFC circuits are required to be coupled in series or in parallel usually. For example, three-level boost PFC circuits are usually employed to let the voltage stresses of the switches be limited to a half of the output voltage in the high voltage applications. In which, apparatuses respectively composed of several boost converters and coupled in parallel are usually employed. Please refer to FIG. 1, it is the schematic diagram of the dual boost PFC circuit in the prior art. In which, two boost units are coupled to the bridge rectifier circuit located at the input side. Compared with the traditional boost converters, the alternatively controlled dual boost PFC circuits have the following advantages: 1. the current level of each unit can be decreased to a-half, and 2. the ripples of the AC current and the output current can be decreased. On the other hand, the configurations of this kind of circuits have their problems: 1. the configurations of the circuits are relatively more complex, 2. the currents of the two sub-circuits are unbalanced due to the discrepancies of the two sets of elements. This phenomenon is relatively more serious when the whole apparatus is operated under the inductor current continuous conduction mode (CCM).

Due to the above-mentioned problems, a simple and effective controlling method for accomplishing the current sharing between the two sub-circuits, controlling the total inductor current, and tracking the output voltage of the bridge-rectifier circuit is required for this kind of circuits. The existing solutions for the aforementioned problem in the prior arts are analyzed as follow.

A dual boost PFC circuit has to guarantee that the total inductor current iL and the rectifying voltage have the same phase such that the AC line current and the AC input voltage could have the same phase, and the current sharing between the two sub-circuits has to be guaranteed also. Thus, there are certain difficulties for this kind of apparatuses to properly accomplish the controlling of the circuit. Firstly, it is the sampling of the current. If the total inductor current iL is sampled, the total inductor current is easy to control, but the balance between the two sub-circuits is not guaranteed. Otherwise, if the inductor current of each sub-circuit is sampled, the current sharing could be guaranteed, but other measures are required to keep the total inductor current and the rectifying voltage at the same phase. Among the traditional controlling methods for the dual boost PFC circuits, the method proposed in "Multiple parallelized boost PFC devices" (China Patent no. CN1353497), which samples the total inductor current and controls the circuit by the power factor control IC UC3854 to make sure that the total inductor current and the rectifying voltage have the same phase. Meanwhile, the output control signal of the UC3854 is divided into two driving signals having a phase-shift of 180 degrees through frequency dividing, which respectively control two sets of main power switches, and let the two sets of power switches conduct alternately. The unique feature of this controlling method is that the total inductor current is being controlled, the AC line current and the AC input voltage have the same phase, and the control circuit is simplified. But this control method does not accomplish the real current sharing, the current difference between the two sub-circuits are not eliminated by this method since there exists current unbalancing between the two sub-circuits due to the discrepancies of the two sets of elements (power switches, boost inductors, output diodes, control circuit dividing elements etc.) of the two sub-circuits. Finally, this will cause the power switch having relatively larger current being over-heated, the boost inductor being saturated, and the efficiency of the system being decreased.

There is another representative controlling method in the prior art, which is proposed by Laszlo Balogh and Richard Redl in "Power-Factor Correction with Interleaved Boost Converters in Continuous-Inductor-Current Mode," Proceedings of APEC' 93, pp. 168–174. A UC3854 control IC is employed to control the total inductor current, to detect the current of each power switch, employ the differential amplifying to amplify the currents of the two sub-circuits, decide the slopes of the two saw-tooth waves for controlling the two pulse signals by the output of the differential amplifier, and accomplish the current sharing. This control method samples the total inductor current, detects the currents of the two sub-circuits, and employs extra peripheral circuits for producing the alternately controlling signals such that the whole control circuit becomes relatively complex due to the total number of elements is increased.

Keeping the drawbacks of the prior arts in mind, and employing experiments and research full-heartily and persistently, the current sharing method and apparatus for alternately controlling the parallel connected boost PFC circuits are finally conceived by the applicants.

SUMMARY OF THE INVENTION

It is therefore an object of the present invention to propose the current-sharing method and the control circuit for alternately controlling the dual boost PFC circuits so as to achieve a relatively higher efficiency of the dual boost PFC circuits.

According to the first aspect of the present invention, the control circuit for alternately controlling parallel-connected first and second boost circuits of a dual boost PFC circuit to achieve a current-sharing of the first and the second boost circuits includes: a first control circuit having a first current control loop for employing an output voltage of the PFC circuit, a feed-forward voltage, and an input reference voltage to generate a current reference, and sending the current reference to an input terminal of the first current control loop to generate a first PWM signal to drive the first boost circuit accordingly, and a second control circuit having a second current control loop for receiving the current reference through an input terminal of the second current control loop to generate a second PWM signal to drive the second boost circuit accordingly, wherein the first and the second current control loops are alternately controlled with a phase-shift having a certain degree value for obtaining an alternate double frequency so as to accomplish the current-sharing of the first and the second boost circuits.

Preferably, the first boost circuit includes a first inductor, a first diode, and a first capacitor electrically connected in series, and includes a first switch having a first terminal electrically connected to a connecting node of the first inductor and the first diode, and a second terminal electrically connected to the first capacitor.

Preferably, the second boost circuit includes a second inductor, a second diode, and a second capacitor electrically connected in series, and includes a second switch having a first terminal electrically connected to a connecting node of the second inductor and the second diode, and a second terminal electrically connected to the second capacitor.

Preferably, the certain degree value is 180 degrees.

Preferably, the control circuit further includes a synchronous pulse signal generator for offering synchronously alternating signals to the first and the second control circuits to produce the phase-shift of 180 degrees.

Preferably, the synchronous pulse signal generator employs two oscillating voltage signals with an equal frequency and two digital pulse signals having a phase-shift of 180 degrees added and synchronized to the two oscillating voltage signals respectively to generate a first saw-tooth wave signal and a second saw-tooth wave signal having the phase-shift of 180 degrees to be used as period signals of the first and the second control circuits respectively.

Preferably, the current reference is compared with a first feedback inductor current of a first current feedback loop of the first control circuit for generating a first signal to be compared with the first saw-tooth wave signal so as to generate the first PWM signal.

Preferably, the current reference is compared with a second feedback inductor current of a second current feedback loop of the second control circuit for generating a second signal to be compared with the second saw-tooth wave signal so as to generate the second PWM signal.

According to the second aspect of the present invention, the method for alternately controlling parallel-connected first and second boost circuits of a dual boost PFC circuit to achieve a current-sharing of the first and the second boost circuits includes the steps of: employing an output voltage of the PFC circuit, a feed-forward voltage, and an input reference voltage to generate a current reference; providing the current reference to an input terminal of a first current control loop to generate a first PWM signal to drive the first boost circuit accordingly; and providing the current reference to an input terminal of a second current control loop to generate a second PWM signal to drive the second boost circuit accordingly; wherein the first and the second current control loops are alternately controlled with a phase-shift having a certain degree value for obtaining an alternate double frequency so as to accomplish the current-sharing of the first and the second boost circuits.

Preferably, the first boost circuit includes a first inductor, a first diode, and a first capacitor electrically connected in series, and includes a first switch having a first terminal electrically connected to a connecting node of the first inductor and the first diode, and a second terminal electrically connected to the first capacitor.

Preferably, the second boost circuit includes a second inductor, a second diode, and a second capacitor electrically connected in series, and includes a second switch having a first terminal electrically connected to a connecting node of the second inductor and the second diode, and a second terminal electrically connected to the second capacitor.

Preferably, the certain degree value is 180 degrees.

Preferably, the method further includes a synchronous pulse signal generating step for offering synchronously alternating signals to the first and the second current control circuits to produce the phase-shift of 180 degrees.

Preferably, the synchronous pulse signal generating step employs two oscillating voltage signals with an equal frequency and two digital pulse signals having a phase-shift of 180 degrees added and synchronized to the two oscillating voltage signals respectively to generate a first saw-tooth wave signal and a second saw-tooth wave signal having the phase-shift of 180 degrees to be used as period signals of the first and the second current control circuits respectively.

Preferably, the current reference is compared with a first feedback inductor current of the first current control circuit for generating a first signal to be compared with the first saw-tooth wave signal to generate the first PWM signal.

Preferably, the current reference is compared with a second feedback inductor current of the second current control circuit for generating a second signal to be compared with the second saw-teeth wave signal to generate the second PWM signal.

The present invention may best be understood through the following descriptions with reference to the accompanying drawings, in which:

DETAILED DESCRIPTION OF THE PREFERRED EMBODIMENT

Figure 1:
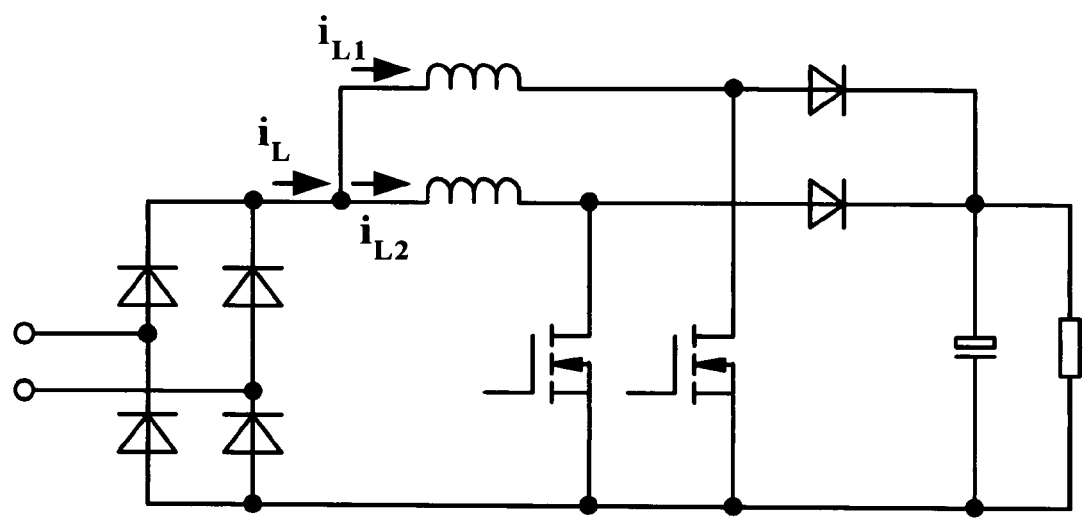
FIG. 1 is the schematic circuit diagram of a typical dual boost PFC DC/DC converter.
Figure 2:
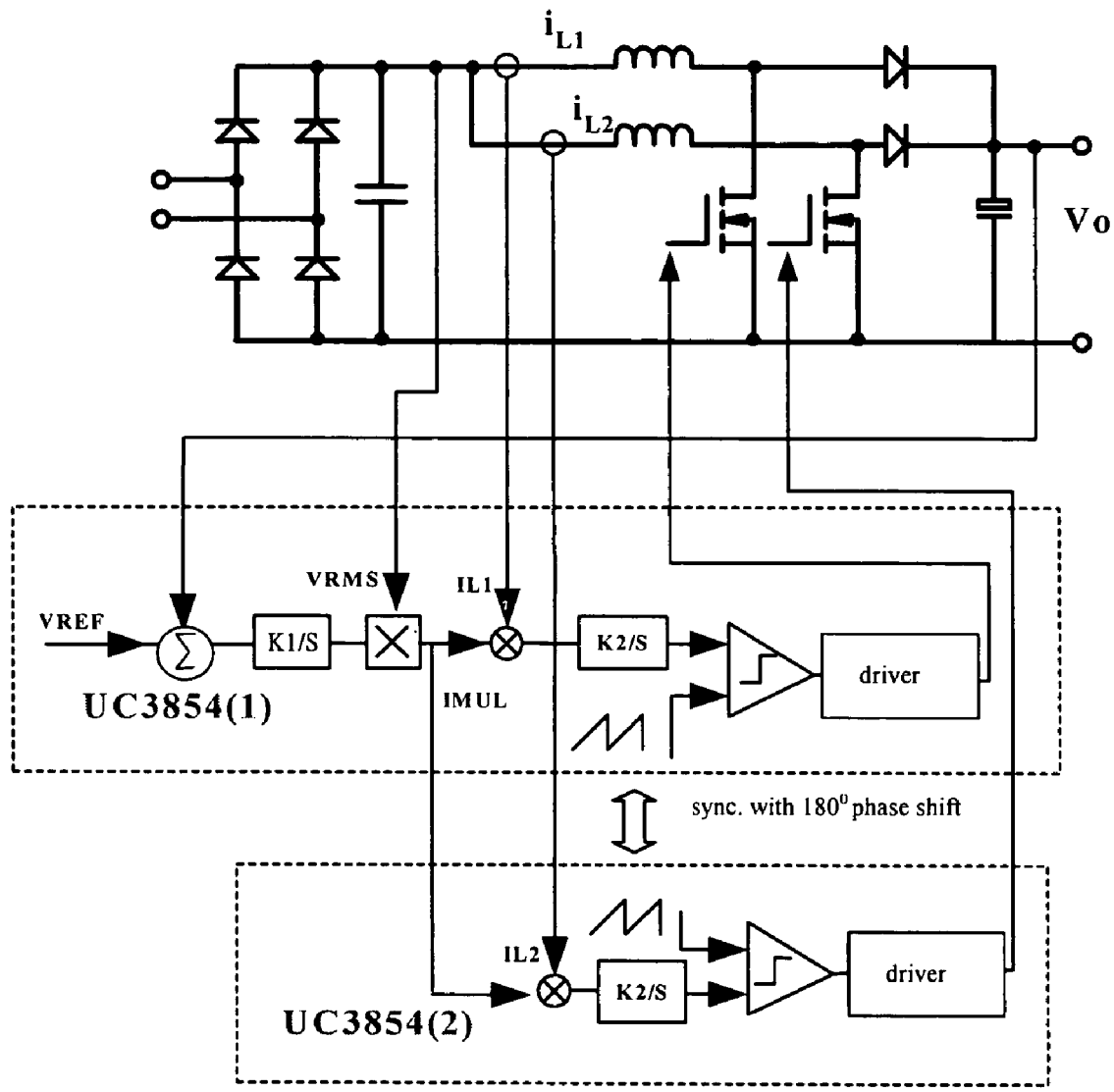
FIG. 2 is the schematic circuit diagram of the preferred embodiment of the present invention having two control IC to share the same current reference.

The controlling alternative of the present invention is described as follows: 1. sampling the inductor current of the two parallel connected sub-circuits; 2. employing two control ICs (e.g., UC3854) respectively control two power switches. The main difference among the proposed method and the aforementioned methods in the prior arts is that the two control ICs in the present invention share the same current reference, IMUL, as shown in FIG. 2.

Two control ICs share the same current reference will make sure that the two inductor currents respectively flowing on one of the two sub-circuits are equal so as to accomplish the current sharing. After employing two of the commonly used control ICs, UC3854s, to control, the two inductor currents respectively flowing on each sub-circuit could track the rectifying voltage relatively good, and the two average values of the currents respectively flowing on the two inductor are equal, thus the total inductor current can be employed to track the rectifying current so as to guarantee the relatively higher power factor. Meanwhile, the two control ICs, UC3854, employ two alternate signals having a phase-shift of 180 degrees to synchronize, to let the two sequences of output control pulses have a phase-shift of 180 degrees to obtain an accurate alternate double frequency effect.

Figure 3:
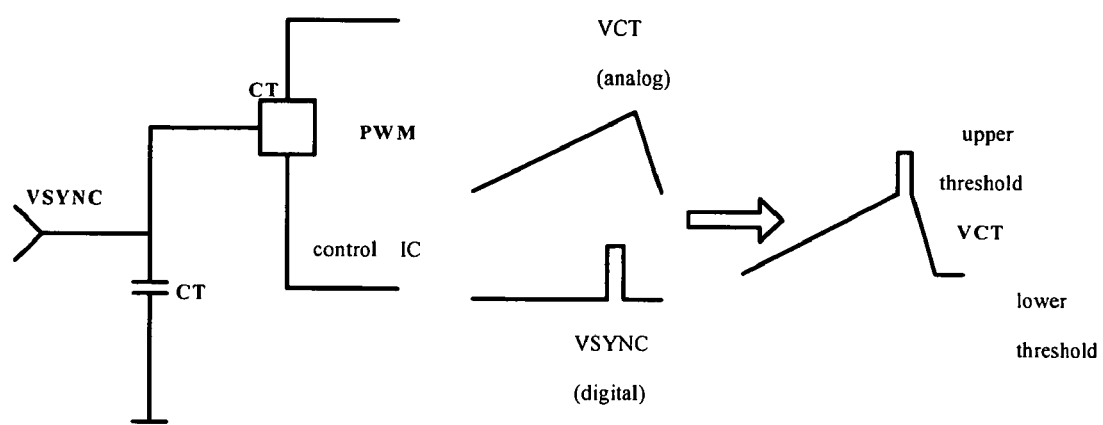
FIG. 3 is the schematic diagram which shows the generation of the synchronous pulse signal of the preferred embodiment of the present invention.

To obtain two alternate signals having a phase-shift of 180 degrees, the method of combining the simulation signal and the digital pulse is employed. Please refer to FIG. 3, a digital synchronous pulse signal, VSYNC, is added onto the capacitor voltage waveform, VCT, of the oscillator of the control IC. The synchronous pulse signal will raise the capacitor voltage to be above the upper limit of the PWM comparator inside the control IC quickly, which will change the charge and discharge statuses of the oscillating circuit, and the discharge period of the oscillator will be the same as the period of the synchronous pulse signal currents.

Figure 4:
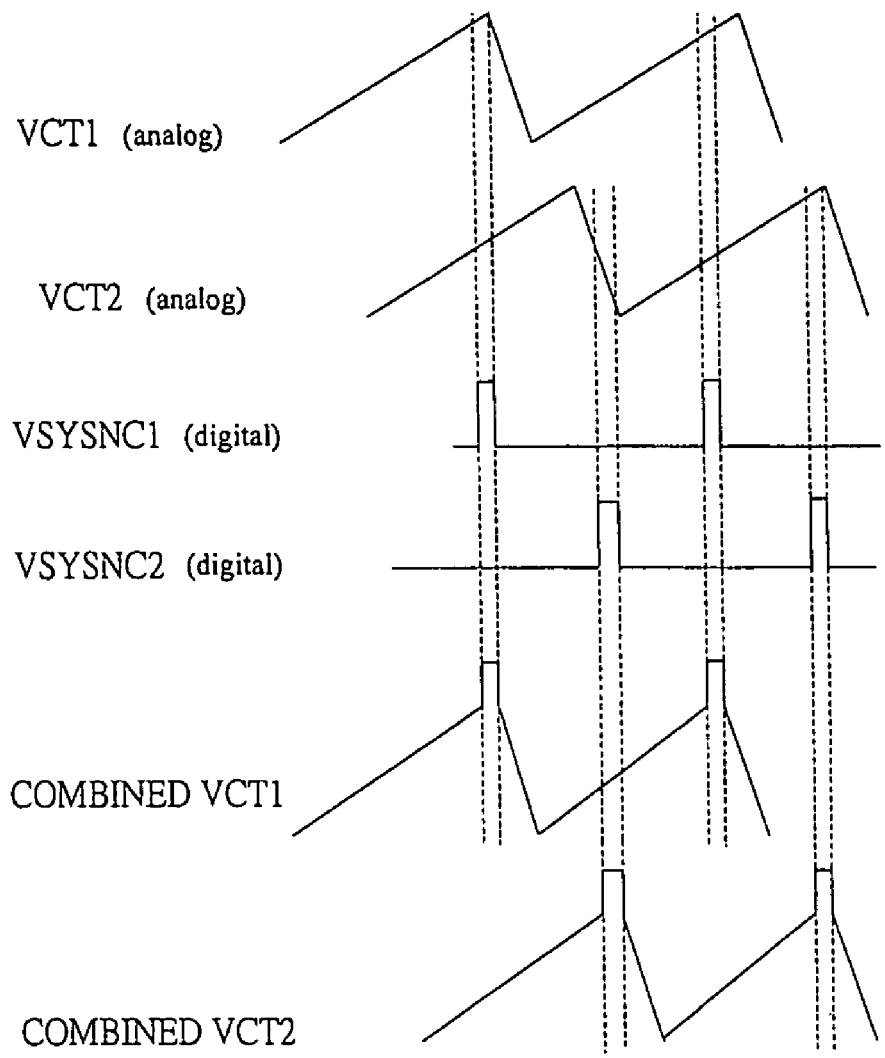
FIG. 4 is the waveform diagram which shows the saw-tooth wave signals having a phase-shift of 180 degrees of the preferred embodiment of the present invention.

Base on the above-mentioned principles, two oscillating voltage signals with an equal frequency, VCT1 and VCT2, are synchronized by two pulse signals having a phase-shift of 180 degrees, VSYSNC1 and VSYSNC2, to get two saw-tooth wave signals having a phase-shift of 180 degrees, COMBINED VCT1 and COMBINED VCT2, as shown in FIG. 4. Employing these two signals as the period signals of the two control ICs' period signals, the two output pulse signals of the two control ICs, UC3854, are guaranteed to have a phase-shift of 180 degrees.

Figure 5:
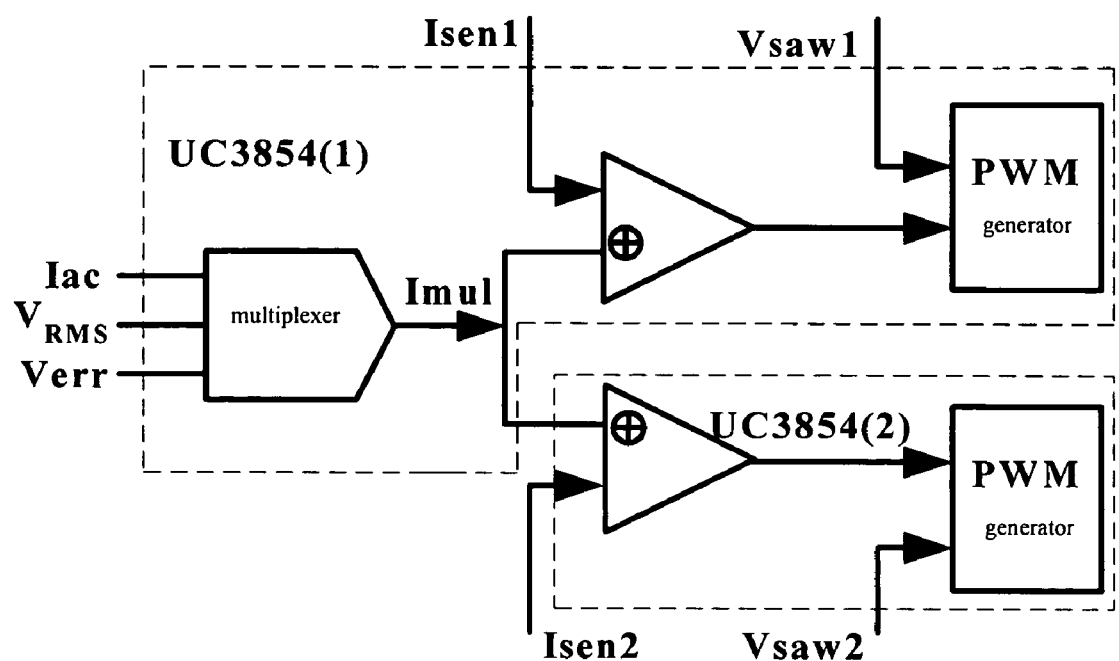
FIG. 5 is the schematic circuit diagram which shows the current control loops of the preferred embodiment of the present invention.

Usually, the current reference of the control IC (e.g., UC3854) is decided by the feedback voltage, the feed-forward voltage, and the input current of the multiplexer (proportional positively to the instantaneous value of the input voltage). In the parallel connected dual boost PFC circuit, two sets of the feed-forward voltage, the instantaneous value of the input voltage, and the feedback voltage (only having one output voltage) are all consistent. To avoid the two current references deviate from each other due to the discrepancies of the two sets of elements, only the multiplexer/divider units in one control IC are used, and those units in another control unit are not employed as shown in FIG. 5. So, only one control IC, UC3854, has the output of the current reference (IMUL), and the other control IC, UC3854, does not have the output of the current reference. Providing the IMUL to the two same-phased input terminals respectively disposed on the two current control loops of the two control ICs simultaneously as the common current reference signal, the two inductor currents of the two sub-circuits tracking the same current reference could be accomplished.

Figure 6:
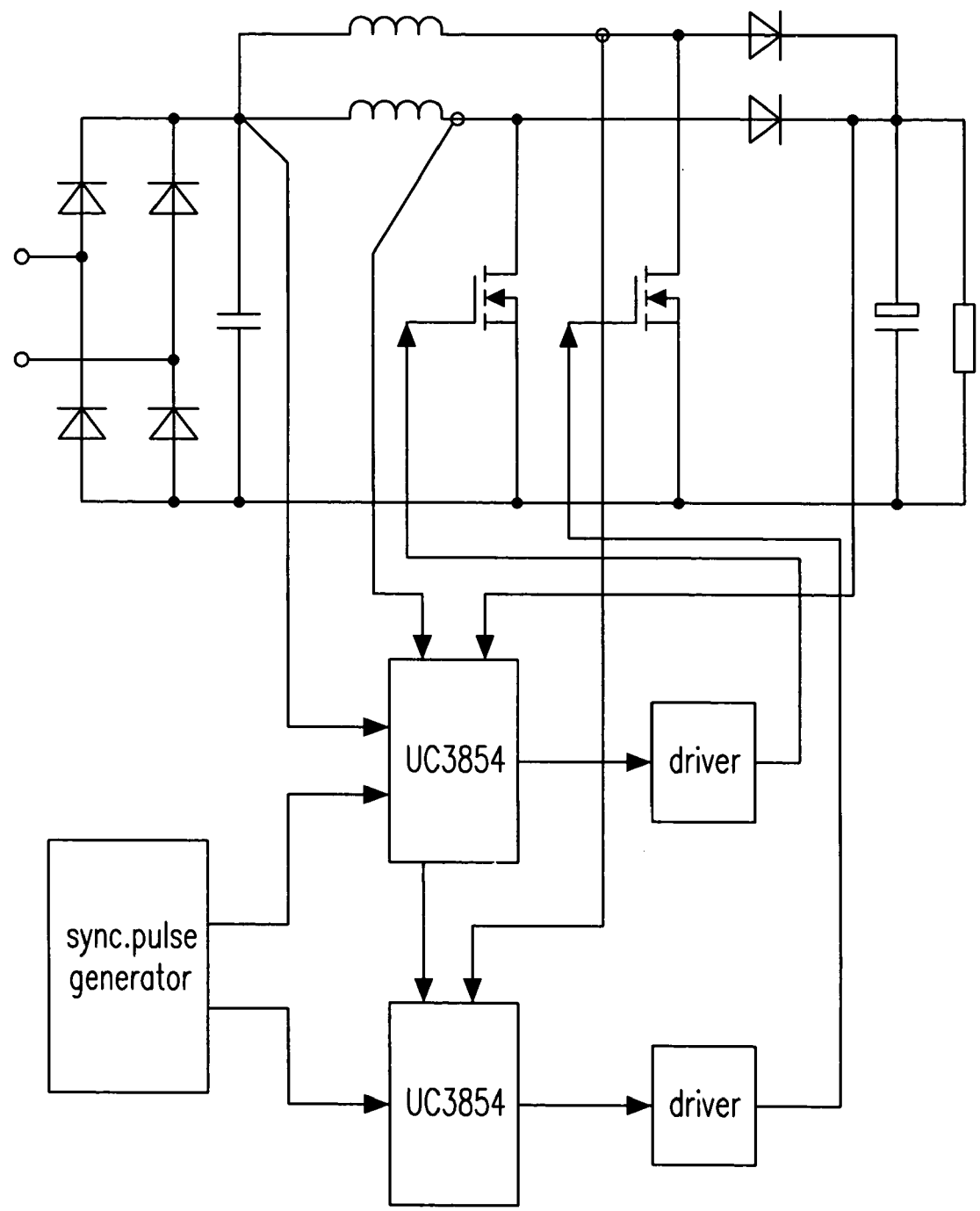
FIG. 6 is the schematic circuit diagram of the preferred embodiment of the present invention having the control circuit and the main circuit of the alternately controlled dual boost PFC circuit coupled in parallel.

Please refer to FIG. 6, it shows the configuration of the main circuit and controlling circuit of the proposed controlling alternative used in the parallel connected alternately controlled dual PFC circuit, which belongs to the scope of the present invention. Among which, the rectifying portion can either employ only one rectifying unit, or two rectifying units respectively disposed on the input side of the two sub-circuits. In which, the synchronous pulse generator can employ one of the TLC494, MCU, DSP, and other frequency divider circuits, the parallel connected/alternately controlled PFC circuits having multiple units (triple or more units) also belong to the preferred embodiment of the present invention, the three-phase AC power source inputted parallel connected/alternately controlled PFC circuits are included in the scope of the present invention too, and the present invention is focus on a commonly used current sharing method for parallel connected/alternately controlled converters and can be used in the current discontinuous conduction mode (DCM) converters too.

In conclusion, the current-sharing method and the control circuit for alternately controlling the dual boost PFC circuits are proposed so as to achieve a relatively higher efficiency of the dual boost PFC circuits.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A control circuit for alternately controlling parallel-connected first and second boost circuits of a dual boost PFC circuit to achieve a current-sharing of said first and said second boost circuits, comprising:

a first control circuit having a first current control loop for employing an output voltage of said PFC circuit, a feed-forward voltage, and an input reference voltage to generate a current reference, and sending said current reference to an input terminal of said first current control loop to generate a first PWM signal to drive said first boost circuit accordingly;

a second control circuit having a second current control loop for receiving said current reference through an input terminal of said second current control loop to generate a second PWM signal to drive said second boost circuit accordingly; and a synchronous pulse signal generator for providing sychronously alternating signals, a first and a second saw-tooth wave signals, to said first and said second control circuits to produce a phase-shift having a certain degree value;

wherein said first and said second current control loops are alternately controlled with said phase-shift of said certain degree value for obtaining an alternate double frequency so as to accomplish said current-sharing of said first and said second boost circuits, and said synchronous pulse signal generator employs two oscillating voltage signals with an equal frequency and two digital pulse signals having said phase-shift of said certain degree value added and synchronized to said two oscillating voltage signals, respectively, to generate said first and said second saw-tooth wave signals having said phase-shift of said certain degree value for use as period signals of said first and said second control circuits, respectively.

2. The control circuit according to claim 1, wherein said first boost circuit comprises a first inductor, a first diode, and a first capacitor electrically connected in series, and comprises a first switch having a first terminal electrically connected to a connecting node of said first inductor and said first diode, and a second terminal electrically connected to said first capacitor.

3. The control circuit according to claim 1, wherein said second boost circuit comprises a second inductor, a second diode, and a second capacitor electrically connected in series, and comprises a second switch having a first terminal electrically connected to a connecting node of said second inductor and said second diode, and a second terminal electrically connected to said second capacitor.

4. The control circuit according to claim 1, wherein said certain degree value is 180 degrees.

5. The control circuit according to claim 4, wherein said current reference is compared with a first feedback inductor current of a first current feedback loop of said first control circuit for generating a first signal to be compared with said first saw-tooth wave signal so as to generate said first PWM signal.

6. The control circuit according to claim 4, wherein said current reference is compared with a second feedback inductor current of a second current feedback loop of said second control circuit for generating a second signal to be compared with said second saw-tooth wave signal so as to generate said second PWM signal.

7. A method for alternately controlling parallel-connected first and second boost circuits of a dual boost PFC circuit to achieve a current-sharing of said first and said second boost circuits, comprising the steps of:
employing an output voltage of said PFC circuit, a feedforward voltage, and an input reference voltage to generate a current reference;
providing said current reference to an input terminal of a first current control loop to generate a first PWM signal to drive said first boost circuit accordingly;
providing said current reference to an input terminal of a second current control loop to generate a second PWM signal to drive said second boost circuit accordingly; and
providing synchronously alternating signals, including a first and a second saw-tooth wave signal, to said first and said second current control circuits to produce a phase-shift having a certain degree value through a synchronous pulse signal generating step;
wherein said first and said second current control loops are alternately controlled with said phase-shift of said certain degree value for obtaining an alternate double frequency so as to accomplish said current-sharing of said first and said second boost circuits and said synchronous pulse signal generator employs two oscillating voltage signals with an equal frequency and two digital pulse signals having said phase-shift of said certain degree value added and synchronized to said two oscillating voltage signals, respectively, to generate said first and said second saw-tooth wave signals having said phase-shift of said certain degree value to be used as period signals of said first and said second control circuits, respectively.

8. The method according to claim 7, wherein said first boost circuit comprises a first inductor, a first diode, and a first capacitor electrically connected in series, and comprises a first switch having a first terminal electrically connected to a connecting node of said first inductor and said first diode, and a second terminal electrically connected to said first capacitor.

9. The method according to claim 7, wherein said second boost circuit comprises a second inductor, a second diode, and a second capacitor electrically connected in series, and comprises a second switch having a first terminal electrically connected to a connecting node of said second inductor and said second diode, and a second terminal electrically connected to said second capacitor.

10. The method according to claim 7, wherein said certain degree value is 180 degrees.

11. The method according to claim 10, wherein said current reference is compared with a first feedback inductor current of said first current control circuit for generating a first signal to be compared with said first saw-tooth wave signal to generate said first PWM signal.

12. The method according to claim 10, wherein said current reference is compared with a second feedback inductor current of said second current control circuit for generating a second signal to be compared with said second saw-teeth wave signal to generate said second PWM signal.

* * * * *